Patented Jan. 6, 1948

2,433,891

UNITED STATES PATENT OFFICE 2,433,891

PREPARING MAGNESIUM OXIDE-CONTAINING MATERIAL FOR REDUCTION PURPOSES

Neil R. Collins and William W. Mower, Los Altos, and Howard Church, Campbell, Calif., assignors, by mesne assignments, to The Permanente Metals Corporation, a corporation of Delaware No Drawing. Application December 16, 1942,
Serial No. 469,226

6 Claims. (Cl. 75—67)

This invention relates to the preparing of magnesium oxide-containing material for the treatment with a solid reducing agent at a reduction temperature.

Reduction of magnesium oxide with the aid of reducing agents such as silicon or its alloys, and particularly with carbon or carbides, does not take place except at very high temperatures. As a consequence thereof the ideal type of feed would be one the particles of which were as finely divided as possible to permit rapid reaction due to interfacial area. This encounters, however, the obstacle that the two sorts of particles tend to separate in the reduction chamber before the reducing agent has had an opportunity to react on the magnesium oxide. This is undesired in the highest degree, since as a consequence thereof not only the yield but also the quality of the final product becomes unsatisfactory. The latter disadvantage is substantially more marked if, for the purpose of neutralizing the former, more than a slight excess of the reducing agent over the theoretical amount be adjoined to the magnesium oxide-containing starting material.

The general object of the present invention is to provide a method which renders it possible to obtain mixtures of magnesium oxide-containing material and the reducing agent containing the components in stoichiometrical proportions with only a slight excess of the reducing agent, if any, in which mixtures both of the components are in the state of very fine subdivision, and which, when heated to reduction temperature, enable the reduction process to be performed with satisfactory results in regard to both the yield and the quality of the final metal.

The underlying idea consists in connecting the preparation of mixtures of magnesium oxide-containing starting material and a reducing agent with the manufacture of magnesium oxide from seawater. To this end, the reducing agent is uniformly incorporated with the precipitate resulting from the treatment of seawater or other brines with reagents capable of precipitating magnesium hydroxide therefrom and the mixture of magnesium hydroxide and reducing agent thus produced is then conditioned for a subsequent treatment at reduction temperature. To put the mixture into proper condition for this purpose, it needs principally dewatering followed by calcination at a temperature appropriate for freeing the magnesium hydroxide from water of hydration and from vaporizable impurities, should concomitants of such kind be present, while having recourse to conditions capable of obviating the risk of the reducing agent being oxidized, or, in the case of a carbonaceous reducing agent, destroyed by combustion to a substantial extent. Means answering this purpose are, for instance, performing the calcining operation in a vacuum or in a non-oxidizing, particularly reducing, atmosphere.

The incorporation of the reducing agent with the magnesium hydroxide precipitate may be brought about by at least two methods:

I. Magnesium hydroxide slurry may be formed by the addition of reagents capable of precipitating the hydroxide from brines containing convertible magnesium salts, calcium hydroxide, or calcined dolomite being preferably used as precipitants. The proper amount of the finely divided reducing agents that at least should suffice stoichiometrically to satisfy the present magnesium salts, considered as magnesium oxide, is then uniformly dispersed in the precipitate at the latest prior, preferably just prior to its final separation from the mother liquor or even better from the washing water.

II. The proper amount of reducing agent may be introduced and uniformly dispersed in a brine preparatory to, advantageously immediately before, precipitating magnesium hydroxide therefrom by the addition of appropriate reagents; the precipitate is thus caused on being formed to carry down a proportional amount of the reducing agent. In this manner magnesium hydroxide precipitation may take place from the solution on the surface of the minute reducing agent particles that become nuclei upon which crystal growth proceeds. On condition that the reducing agent be introduced into the brine in such a ratio as to yield final particles that contain magnesium hydroxide and the reducing agent in stoichiometrical proportions, the two materials will enter into and pass through the calcining step closely associated in the proper relation.

In case the carbon is mixed with magnesium hydroxide slurry after the precipitation of the latter, there will obviously result a mixture which is not quite of the same intimacy as the mixture produced by method II. However, the particle size of the precipitated material is sufficiently small to assure intimate mixing and close association, provided that the reducing agent be in a state of fine subdivision and that mixing be done before any heating in the dry or semi-dry condition takes place, and preferably before separating the precipitate from the mother liquor or, still better, from the washing water.

Both of the above described methods of preparing the mixture in question may be carried into practice as batch or continuous processes.

Regarding the step of precipitating magnesium hydroxide from the brines, there is no detailed description needed, since the expedients for obtaining rapidly settling and pure precipitates are known to those skilled in the art.

As has been stated above, it is feasible to calcine the mixtures prepared by the methods I or II without substantial loss of the reducing agent occuring, provided the atmosphere of the kiln be properly controlled. In addition to the expedients fit for this purpose, in case carbonaceous reducing agents are being used, the mixture under treatment may advantageously be calcined in contact with material capable of being decomposed at the prevailing temperatures, with the formation of carbon, for instance with an amount of hydrocarbon, preferably in the liquid condition. In the range of temperature between 800 and 1250° C. hydrocarbons are cracked into hydrogen and finely divided carbon, and the latter deposits in the mass of magnesium oxide, forming an extremely intimate mixture. Below 1250° C., which temperature as a rule suffices for freeing the magnesium oxide-containing material entirely from water of hydration and volatilizable concomitants, the carbonaceous reducing agent will substantially be prevented from burning; should, however, some of the carbonaceous matter be destroyed, the carbonization of the additional material will serve to replace the losses that may have arisen in the course of the calcination operation. According to another mode of carrying the method into practice, the calcining operation may be started with mixtures containing an excess of carbonaceous reducing agent sufficing for making up the potential losses during calcination. The carbonaceous matter burning away has proved highly useful in raising the calcination temperature.

When the calcined mixture emerges from the kiln, it has to be retained in an inert atmosphere until it has cooled down to a temperature at which contact with the air will no longer injure the reducing agent.

The calcined mixture may be made into compacted bodies, for instance pellets or briquettes, before or after the calcining operation, or as well fed into the reduction furnace directly in the calcined state, without any pretreatment being needed; only in case lumps should have been formed, these ought to be previously crushed into particles of appropriate sizes.

In the case of using a carbonaceous reducing agent, the same may be introduced, at least in part, in the state of a coke-forming material, such as tar and/or powdered or molten pitch, to unite the ingredients and hold them together when they are afterwards heated. Should additions of this kind be made after the calcining operation, it may be advantageous to subject the mixture thus obtained to a heat treatment under strictly non-oxidizing conditions, prior to the treatment at reduction temperature to convert the binder into a coke-matrix which firmly binds the magnesium oxide particles and carbonaceous reducing agent into a coherent mass. Effecting this heat treatment under agitation results in agglomerated bodies coming out therefrom.

The same object may be attained by using powdered coal, particularly volatile coal, as carbonaceous matter or adding powdered coal, particularly volatile coal, to a mixture of magnesium hydroxide or magnesium oxide and coke, and converting the coal by distillation under exclusion of air into semi-coke, preferably while agitating the mass under treatment to form agglomerates thereof.

The term "dolomite" as used in this specification and the appended claims refers to minerals containing calcium carbonate in conjunction with substantial amounts of magnesium carbonate and shall not be construed to limit the invention to the use of dolomite ($MgCO_3.CaCO_3$).

The term "brine" is used throughout the specification and in the claims to include not only seawater and inland brines but also bitterns resulting from the evaporation of seawater and concentration of inland brines, respectively.

We claim:

1. The method of preparing magnesium oxide-containing material for the treatment with a predetermined quantity of solid reducing agent, which method comprises introducing and uniformly dispersing the solid reducing agent in a brine containing convertible magnesium salts, the amount of reducing agent being at the least sufficient stoichiometrically to satisfy the present magnesium salts considered as magnesium oxide, and contacting the brine under treatment with a reagent capable of precipitating magnesium hydroxide therefrom, and thereby causing the precipitate being formed to carry down a proportional amount of the reducing agent; and thereafter removing the mixture of solids from the mother liquor and conditioning said mixture for a subsequent treatment at reduction temperature.

2. The method of preparing magnesium oxide-containing starting material for the treatment with a predetermined quantity of solid reducing agent, which method comprises introducing and uniformly dispersing the solid reducing agent in a brine containing convertible magnesium salts, the amount of reducing agent being at the least sufficient stoichiometrically to satisfy the total amount of the present magnesium salts considered as magnesium oxide, and contacting the brine under treatment with hydroxides capable of precipitating magnesium hydroxide therefrom, and thereby causing the precipitate being formed to carry down a proportional amount of the reducing agent; and then removing the mixture of solids from the mother liquor, dewatering it and calcining it under conditions adapted to relieve the magnesium hydroxide from water of hydration and capable of obviating the risk of a substantial part of the reducing agent being oxidized.

3. The method of preparing magnesium oxide-containing starting material for the treatment with a predetermined quantity of solid reducing agent, which method comprises introducing and uniformly dispersing the solid reducing agent in a batch of brine containing convertible magnesium salts, the amount of reducing agent being at least sufficient stoichiometrically to satisfy the total amount of the present magnesium salts considered as magnesium oxide, and immediately thereafter contacting the brine under treatment with a hydroxide capable of precipitating magnesium hydroxide therefrom; and thereby causing the precipitate being formed to carry down a proportional amount of the reducing agent; and then removing the mixture of solids from the mother liquor, washing and dewatering it, and calcining it at a temperature adapted to relieve the magnesium hydroxide from water of hydration, while having recourse to conditions capable of substantially preventing the reducing agent from being oxidized.

4. The method of preparing magnesium oxide-containing starting material for the treatment with a predetermined quantity of carbonaceous reducing agent, which method comprises introducing and uniformly dispersing the reducing agent in a batch of brine containing convertible magnesium salts, the amount of reducing agent being at the least sufficient stoichiometrically to satisfy the total amount of the present magnesium salts considered as magnesium oxide, and immediately thereafter contacting the brine under treatment with calcium hydroxide to precipitate magnesium hydroxide therefrom, and causing the precipitate being formed to carry down a proportional amount of the reducing agent; and then removing the mixture of solids from the mother liquor, washing and dewatering it, and calcining it at a temperature adapted to relieve the magnesium hydroxide from water of hydration and volatizable impurities, while having recourse to conditions capable of substantially preventing the carbonaceous reducing agent from being oxidized.

5. The method of preparing magnesium oxide-containing starting material for the treatment with a predetermined quantity of solid reducing agent, which method comprises feeding the reducing agent at a controlled rate into a convertible magnesium salt containing brine to produce a suspension of the reducing agent in the brine, and then contacting the said suspension with a hydroxide capable of precipitating magnesium hydroxide from the brine to cause the formation of a precipitate carrying down a proportional amount of the reducing agent; and removing the mixture of solids thus produced from the mother liquor and conditioning said mixture for a subsequent treatment at reduction temperature.

6. The method of preparing magnesium oxide-containing material for the treatment with a predetermined amount of carbonaceous reducing agent, which method comprises feeding the carbonaceous matter in a finely subdivided state at a controlled rate into a convertible magnesium salt containing brine to produce a suspension of the carbonaceous matter in the brine, and contacting the said suspension with a hydroxide capable of precipitating magnesium hydroxide from the brine, to cause the formation of a precipitate carrying down a proportional amount of the reducing agent; then removing the mixture of solids thus produced from the mother liquor, washing and dewatering it, and subjecting the same to a heat treatment capable of enabling the magnesium hydroxide to be relieved from water of hydration without substantial oxidation occurring thereby of the carbonaceous reducing agent present.

NEIL R. COLLINS.
WILLIAM W. MOWER.
HOWARD CHURCH.

REFERENCES CITED

The following references are of record in the file of this patent:

UNITED STATES PATENTS

| Number | Name | Date |
| --- | --- | --- |
| 1,519,470 | Wilson | Dec. 16, 1924 |
| 2,256,161 | Hanawalt | Sept. 16, 1941 |
| 2,295,105 | Gloss | Sept. 8, 1942 |